(12) United States Patent
Cole et al.

(10) Patent No.: US 7,044,069 B2
(45) Date of Patent: May 16, 2006

(54) MULTI RETORT PYROLYTIC WASTE TREATMENT SYSTEM

(75) Inventors: Cameron Cole, Rainbow, CA (US);
Raul de la Torres, Bell Gardens, CA (US); Toby L. Cole, Temecula, CA (US); Dan Watts, Surfside, CA (US)

(73) Assignee: International Environmental Solutions Corporation, Romoland, CA (US)

( * ) Notice: Subject to any disclaimer, the term of this patent is extended or adjusted under 35 U.S.C. 154(b) by 0 days.

(21) Appl. No.: 10/923,467

(22) Filed: Aug. 19, 2004

(65) Prior Publication Data

US 2005/0039652 A1 Feb. 24, 2005

Related U.S. Application Data

(60) Provisional application No. 60/497,397, filed on Aug. 21, 2003.

(51) Int. Cl.
*F23B 7/00* (2006.01)
*F23G 5/12* (2006.01)

(52) U.S. Cl. ............................ 110/341; 110/229
(58) Field of Classification Search ............... 110/229, 110/230, 231, 224, 210, 214, 315, 316
See application file for complete search history.

(56) References Cited

U.S. PATENT DOCUMENTS

| | | | | |
|---|---|---|---|---|
| 4,432,290 | A | * | 2/1984 | Ishii et al. ............... 110/346 |
| 4,759,300 | A | | 7/1988 | Hansen et al. ............ 110/229 |
| 4,821,653 | A | * | 4/1989 | Jones ...................... 110/229 |
| 5,653,183 | A | | 8/1997 | Hansen et al. ............ 110/346 |
| 5,669,317 | A | * | 9/1997 | May et al. ................ 110/229 |
| 5,868,085 | A | | 2/1999 | Hansen et al. ............ 110/346 |
| 6,439,135 | B1 | * | 8/2002 | Pope ....................... 110/233 |
| 6,619,214 | B1 | | 9/2003 | Walker .................... 110/229 |

* cited by examiner

*Primary Examiner*—Kenneth Rinehart
(74) *Attorney, Agent, or Firm*—Rutan & Tucker, LLP

(57) ABSTRACT

The inventive subject matter is directed toward a pyrolytic waste treatment system having multiple pyrolysis chambers. It is contemplated that the system is adapted to heat at least one pyrolysis chamber independently of at least one other pyrolysis chamber.

6 Claims, 1 Drawing Sheet

MULTI RETORT PYROLYTIC WASTE TREATMENT SYSTEM

This application claims the benefit of U.S. provisional application No. 60/497,397 filed on 21 Aug. 2003 incorporated herein by reference in its entirety.

FIELD OF THE INVENTION

The field of the invention is pyrolytic waste treatment.

BACKGROUND OF THE INVENTION

Pyrolysis is a known method for treatment of waste. Examples of pyrolytic waste treatment systems can be found in U.S. Pat. Nos. 4,759,300, 5,653,183, 5,868,085, and 6,619,214. Unlike incineration, pyrolysis is the destructive decomposition of waste materials using indirect heat in the absence of oxygen. Burning wastes through incineration with direct flame in the presence of oxygen can be explosive, causing turbulence in the burning chamber, which fosters a recombination of released gases. Waste destruction in an oxygen-rich atmosphere makes conversion far less complete, is highly inefficient and creates harmful substances.

In contrast, the pyrolytic process employs high temperature in, most desirably, an atmosphere substantially free of oxygen (for example, in a practical vacuum), to convert the solid components of waste to a mixture of solids, liquids, and gases with proportions determined by. operating temperature, pressure, oxygen content, and other conditions. The solid residue remaining after pyrolysis commonly is referred to as char. The vaporized product of pyrolysis is often further treated by a process promoting oxidation, which "cleans" the vapors to eliminate oils and other particulate matter there from, allowing the resultant gases then to be safely released to the atmosphere.

What has long been needed and heretofore has been unavailable is an improved pyrolytic waste treatment system that is highly efficient, is easy to maintain, is safe, reliable and capable of operation with a wide variety of compositions of waste materials, and that can be constructed and installed at relatively low cost. The thrust of the present invention is to provide such an improved pyrolytic waste treatment system.

SUMMARY OF THE INVENTION

The inventive subject matter is directed toward a pyrolysis waste treatment system comprising at least two pyrolysis chambers, wherein the system is adapted to heat at least one pyrolysis chamber independently of at least one other pyrolysis chamber.

The inventive subject matter further comprises methods of pyrolyzing waste in a pyrolysis chamber including the ordered steps of: producing gases by pyrolyzing waste in a pyrolysis chamber; and at least partially heating the pyrolysis chamber using gasses heated in a thermal oxidizer.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
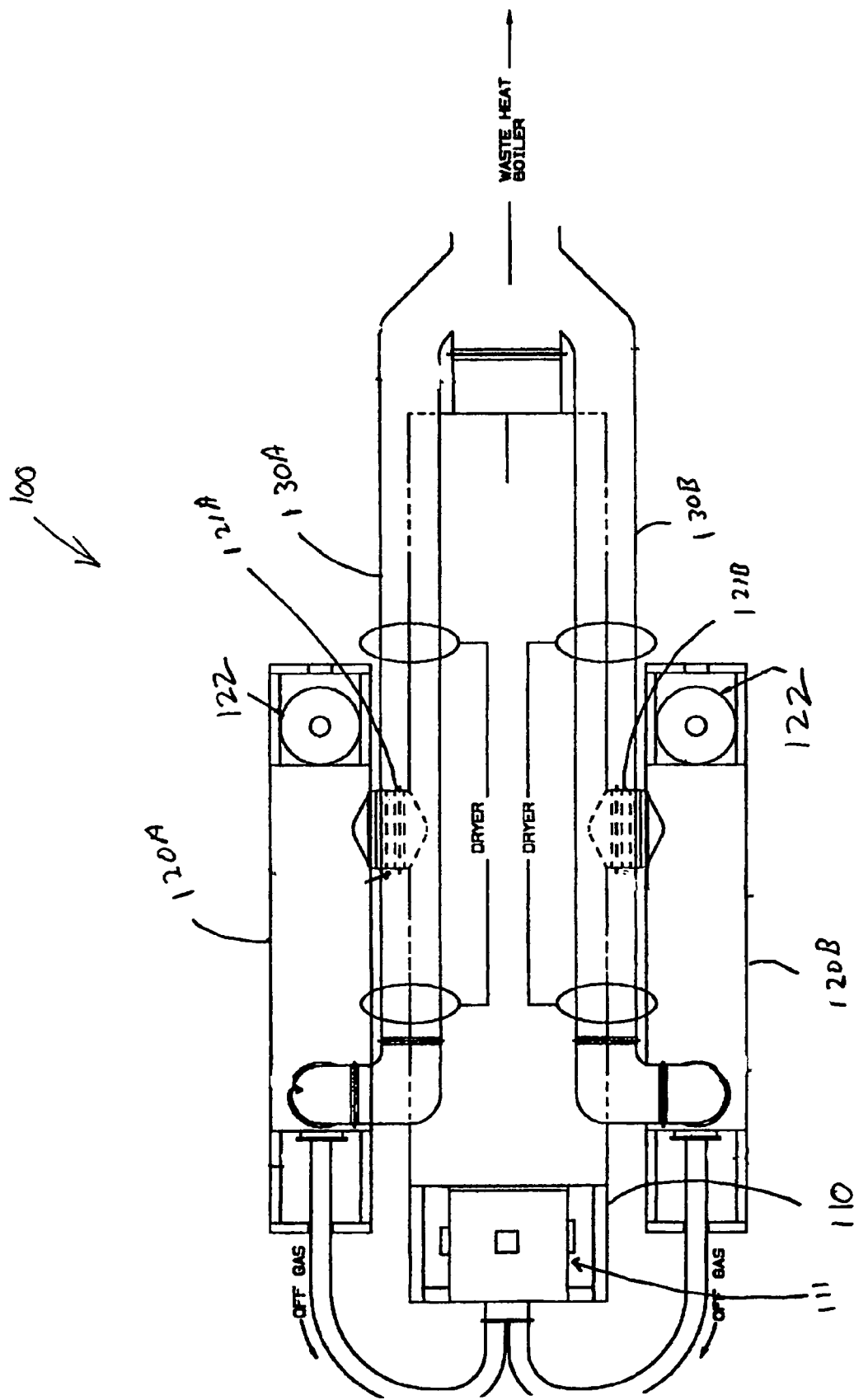
FIG. 1 is a schematic of a pyrolytic waste treatment system.

A pyrolytic waste treatment system utilizes gasses generated by pyrolysis as well as other gasses heated in a thermal oxidizer as a heat source for subsequent pyrolysis and, in some instances, drying of waste being treated. Multiple pyrolysis chambers may also be used to minimize maintenance downtime. In some instances, pyrolysis treatment systems can comprise at least two pyrolysis chambers, wherein the system is adapted to heat at least one pyrolysis chamber independently of at least one other pyrolysis chamber. Additionally, systems may be adapted to at least partially heat at least one pyrolysis chamber, and or at least one dryer, using gasses heated by a thermal oxidizer.

A thermal oxidizer ("afterburner") is used to reduce pollutants from gases generated by pyrolysis, with heat generated by the afterburner subsequently being used to both initiate and sustain pyrolysis as well as being used to dry materials to be subjected to pyrolysis. Heat generated by the afterburner is also used in other downstream heat driven processes.

System 1 is adapted to selectively use any combination of one or more of the at least two pyrolysis chambers to pyrolyze waste while at least one other pyrolysis chamber is permitted to cool as it comprises doors which can be controlled to route gasses to all chamber or to a subset of chambers, or to prevent routing of gasses to any chambers. Since the gasses are the heat sources for the chambers, not-routing gasses into the chambers allows the corresponding pyrolysis subsystem to cool.

FIG. 1 illustrates a portion of a dual retort pyrolysis treatment system 100 that uses heat from thermal oxidization for pyrolysis and drying tat comprises a thermal oxidizer 110, pyrolysis subsystems 120A and 120B, and dryers 130A and 130B. Each pyrolysis subsystem comprises at least one pyrolysis chamber, and the two pyrolysis subsyrems 120A and 120B work in parallel with each other when both subsystems are operational. The dual chamber set up for system 100 allows the system to continue to pyrolytically treat waste with just one pyrolysis chamber working. This allows one chamber to be shut down for maintenance or upgrades without stopping waste treatment.

The two pyrolysis subsystems 120A and 120B of system 100 are located on opposite sides of the thermal oxidizer 110. The pyrolysis subsystems 120A and 120B are arranged such inlets 121A and 121B provide a route for gasses from the oxidizer output stream to enter into the heating chambers of the subsystems at a point where maximum beating of the pyrolysis chambers of the subsystems is desired. Inlets 121A and 121B comprise a set of controlled doors between the hearing chambers of subsystems 120A and 120B and the thermal oxidizer 110 downstream of its burners 111. These doors open into the gas flow of the thermal oxidizer 110 to force some of the hot gases into the heating chambers of pyrolysis subsystems 120A and 120B. The hot gases forced into the heating chamber will then heat pyrolysis chambers and the waste they contain to the desired temperature for the pyrolysis process to happen. Once the hot gas in the pyrolysis subsystem heating chambers is done heating the waste inside the pyrolysis chambers, it is ducted from the hearing chambers and into the heating chambers of dryers 130A and 130B.

System 100 embodies a method of pyrolyzing waste comprising pyrolyzing waste in a pyrolysis chamber at least partially heated using gasses heated in a thermal oxidizer after at least a portion of such gasses were produced by pyrolyzing waste in the pyrolysis chamber. In that method pyrolyzing waste in the pyrolysis chamber can occur while maintenance is performed on a second pyrolysis chamber wherein at least a portion of the gasses used to heat the pyrolysis chamber were produced by pyrolyzing waste in the second pyrolysis chamber. System 100 also embodies a method that comprises using at least a portion of the gasses used to heat the pyrolysis chamber to heat a dryer being used to dry waste that will subsequently be pyrolyzed in the pyrolysis chamber.

It should also be pointed out that feed stock hoppers 122 are employed in the embodiment depicted in FIG. 1. Feed stock hoppers are tapered at the top and wider at the bottom in a reverse funnel type configuration. It has been found that this configuration is advantageous in preventing clogging of the hopper.

Thus, specific embodiments and applications of a pyrolytic system have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of pyrolyzing waste comprising pyrolyzing waste in at least two pyrolysis chambers by channeling at least partially heated gasses heated in a thermal oxidizer and subsequently channel such gasses into the at least two pyrolysis chambers, after at least a portion of such gasses were produced by pyrolyzing waste in the at least two pyrolysis chambers and subsequently channeled into the thermal oxidizer.

2. The method of claim 1, wherein pyrolyzing waste in the pyrolysis chamber occurs while maintenance is performed on a second pyrolysis chamber, and wherein at least a portion of the gasses used to heat the pyrolysis chamber were produced by pyrolyzing waste in the second pyrolysis chamber.

3. The method of claim 1, further comprising using at least a portion of the gasses used to heat the pyrolysis chamber to heat a dryer being used to dry waste that will subsequently be pyrolyzed in the pyrolysis chamber.

4. A pyrolysis waste treatment system comprising at least two pyrolysis chambers coupled to each other, wherein the system is adapted to at least partially heat at least one pyrolysis chamber independently of at least one other pyrolysis chamber using hear generated by a thermal oxidizer, and the system further adapted to channel gasses produced in at least two pyrolysis chambers, to the thermal oxidizer and to channel gasses heated by and exiting the thermal oxidizer into contact with both of the at least two pyrolysis chambers, wherein the gasses produced in the pyrolysis chamber are produced by pyrolysis of waste.

5. The system of claim 4, further adapted to heat a dryer using gasses used to heat at least one of the at least two pyrolysis chambers.

6. The system of claim 5, further adapted to selectively use any combination of one or more of the at least two pyrolysis chambers to pyrolyze waste while at least one other pyrolysis chamber is permitted to cool.

\* \* \* \* \*